(12) United States Patent
Bailey

(10) Patent No.: US 6,709,213 B2
(45) Date of Patent: Mar. 23, 2004

(54) ADAPTER FOR HANGER BOLTS

(76) Inventor: Ray Bailey, 4115 SW. 72nd Ave., Miami, FL (US) 33155

( * ) Notice: Subject to any disclaimer, the term of this patent is extended or adjusted under 35 U.S.C. 154(b) by 0 days.

(21) Appl. No.: 10/163,027

(22) Filed: Jun. 5, 2002

(65) Prior Publication Data

US 2003/0068211 A1 Apr. 10, 2003

Related U.S. Application Data

(60) Provisional application No. 60/327,981, filed on Oct. 9, 2001.

(51) Int. Cl.⁷ .............................. F16B 23/00; F16B 35/02
(52) U.S. Cl. ...................... 411/384; 411/393; 411/397; 411/429; 411/432
(58) Field of Search ................................. 411/383, 384, 411/389, 393, 397, 429, 432

(56) References Cited

U.S. PATENT DOCUMENTS

| | | | | |
|---|---|---|---|---|
| 2,907,245 A | * | 10/1959 | Whitson | 411/393 |
| 4,840,529 A | * | 6/1989 | Phillips | 411/384 X |
| 4,926,953 A | * | 5/1990 | Platt | 411/384 X |
| 5,312,005 A | * | 5/1994 | Odell | 411/397 X |

\* cited by examiner

*Primary Examiner*—Neill Wilson
(74) *Attorney, Agent, or Firm*—Robert M. Schwartz

(57) ABSTRACT

An adapter for hanger bolts is disclosed that includes a hex head adapted for use in a receiving device, a socket head set screw having a thread, wherein the socket head set screw is set at least partially in a socket head set screw receptacle of the hex head, and a hanger bolt housing having a hanger bolt channel abutting an end of the socket head set screw receptacle.

15 Claims, 3 Drawing Sheets

ADAPTER FOR HANGER BOLTS

CROSS-REFERENCES TO RELATED APPLICATIONS

This application claims the benefit of U.S. Provisional Application Ser. No. 60/327,981, filed on Oct. 9, 2001, entitled ADAPTER FOR HANGER BOLTS.

TECHNICAL FIELD

The present invention relates generally to securing protective structures for windows in high wind conditions including those found in hurricanes, cyclones, and typhoons. In particular, the present invention relates to an adapter for hanger bolts used to efficiently drill hanger bolts into a substrate in order to secure protective structures for windows or other structures during high winds and inclement weather.

BACKGROUND OF THE INVENTION

The temporary attachment of storm shutters over windows and doors is often more desirable than installing permanent shutters for both aesthetic alternatives and low cost. Frequently, storm shutters are merely nailed to and subsequently removed from building structures in temporary manners that blemish buildings and require too much of the already limited time available in emergency conditions. Plywood is typically nailed over windows and patio doors during hurricane warnings to prevent rain and debris imparted with the wind's force from breaking windows and entering the structure. Nailing sheets of plywood over windows is often difficult on many structures, and, unfortunately, can take too long to secure a shutter or panel over each window. Furthermore, fierce winds can pull out plywood that has been nailed down.

Homeowners are generally reluctant to drive nails into their own window frames or to be on ladders during inclement weather. Moreover, most individuals cannot grip both large, cumbersome pieces of plywood or shutters while nailing them in when a hurricane is forecasted.

Plywood or shutters that are nailed to a window frame can also be blown out of a structure due to the higher pressure on the inside of the structure in relation to the lower pressure on the outside of the structure during high winds. This is due to the Bernoulli effects, observed where wind blowing around and over a structure causes lower pressure on one side relative to the pressure on the other side, causing the window, wall, or roof to be blown out. This is similar to the situation that occurs where an airplane rises due to the pressure differential where faster air moves over a wing structure, resulting in a lower pressure over the wing structure, in relation to the high pressure of slower moving air under a wing. The pressure differential causes the wing structure to be pushed upwards, resulting in lift. Thus, the windows, walls, or roof blow outward from a structure due to the Bernoulli effects of wind moving rapidly over to the structure. When the window, side wall, or other component of a structure is blown out, the stiffness of the roof and structure generally is decreased as a result of the wind gaining access into the structure. Wind-driven rain, along with the debris can damage the contents in the structure. In addition, these elements can further damage the structural integrity of the walls and roof of the structure.

In the past, homeowners believed that their structure's walls could be prevented from being blown out by relieving the high pressure differential on the inside of the structure through the opening of windows. However, the opened windows allowed wind, rain, and debris inside. Moreover, if the windows were opened only on one side of the structure, the wind could rapidly change direction and blow out the walls or roof as a way out was sought. The resulting damage would eliminate any benefit of attempting to relieve the pressure differential.

Plywood can still be applied as the shutter material in the present invention, however, steel and other desirable materials can be used as well, including newly developed materials as they become commercially available.

Furthermore, with the increasing use of powered drills, the utilization of wood screws or other threaded bolts as fasteners instead of nails is now economically feasible. Standard screws have several weaknesses, particularly in the case of large loading. Foremost, it has been demonstrated that the heavy duty power drivers often break the heads off of standard screws prior to the clutch disengaging the drive at the end of the driving cycle. This often occurs when the head suddenly reached an immovable portion, such as sheet metal. Further, the screws that had adequate unthreaded portions in order to resist the large shear loads would split the wood upon installation, or shortly thereafter, since the diameter of the unthreaded portions was larger than the diameter of the bore made by the threaded portion of the screw. In addition, existing screw fasteners with unthreaded portions adjacent the head that had smaller diameters to prevent wood splitting were not able to be fastened tightly.

The above-mentioned issues are particularly problematic where the shear loads are cycling loads, as they are in earthquakes and hurricanes. In such circumstances, each reversal of the shear loading tends to widen the bore opening until a major loosening occurs. At such point, the loads are impact loads and can endanger the structure to wood splitting.

Prior to the present invention, an adapter for hanger bolts used to efficiently drill hanger bolts into a substrate in order to secure protective structures for windows during high winds and inclement weather, such as hurricanes, that satisfactorily solves the weaknesses associated with the more conventional screws in an efficient, practical and economically affordable manner has not been proposed or suggested by those skilled in the art.

Thus, there is a need for an adapter for hanger bolts that overcomes the aforementioned shortcomings of the prior art.

SUMMARY OF THE INVENTION

The present invention eliminates the above-mentioned needs for an adapter for hanger bolts by providing an adapter to efficiently drill hanger bolts into a substrate that further provides the ability to secure protective structures for windows to be used during high winds and inclement weather.

In accordance with the present invention, there is provided an adapter for hanger bolts. The adapter for hanger bolts includes a hex head adapted for use in a receiving device, a socket head set screw having a thread, wherein the socket head set screw is set at least partially in a socket head set screw receptacle of the hex head, and a hanger bolt housing having a hanger bolt channel abutting an end of the socket head set screw receptacle.

Accordingly, it is an objective of the present invention to disclose an adapter for hanger bolts that is capable of both efficiently drilling hanger bolts into a substrate and easily removing hanger bolts from threaded engagement within the adapter.

BRIEF DESCRIPTION OF THE DRAWINGS

FIG. 4b is an illustration of a side view of a hanger bolt in operative engagement with the alternative embodiment of FIG. 4a.

DETAILED DESCRIPTION

Figure 1:
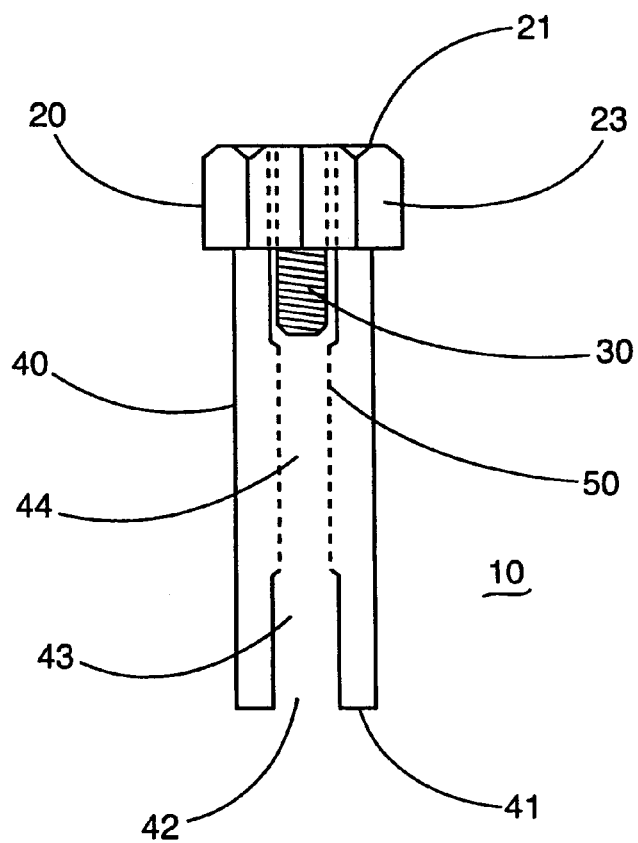
FIG. 1 is an illustration of a side view of the preferred embodiment of the present invention.

Referring now to FIG. 1, a preferred embodiment of the present invention is illustrated as adapter 10 for hanger bolts. Adapter 10 includes a hex head 20 adapted for use in a drill, speed wrench, ratchet, or the like. Adapter 10 also includes a socket head set screw 30 having a left-handed thread that is set at least partially in hex head 20. Adapter 10 further includes a hanger bolt housing 40.

Figure 2:
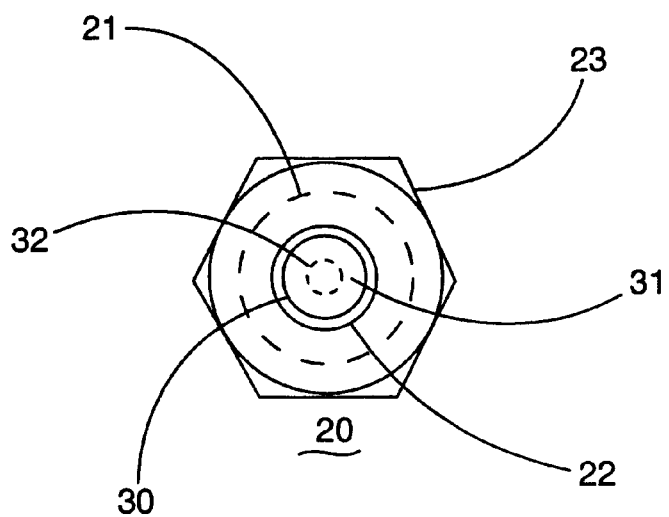
FIG. 2 is an illustration of a top view of the present invention of FIG. 1.

As illustrated in FIG. 2, hex head 20 has a first upper surface 21. First upper surface 21 is the portion of hex head 20 adapted for an adjoining position to the drill, speed wrench, ratchet, or the like. First upper surface 21 provides for a better fit within the drill, speed wrench, ratchet, or the like so as to assist in limiting movement of adapter 10. Referring again to FIG. 1, side surfaces 23 of hex head 20 are constructed to engage a drill, speed wrench, ratchet, or the similar attachment, such as a socket attachment or the like, as is well known. Hex head 20 and side surfaces 23 can vary in their dimensions in order to be functional for use with the numerous conventional drill, speed wrench, ratchet, or the similar attachments known to those skilled in the art.

As shown in FIG. 2, first upper surface 21 includes a socket head set screw access opening 22 for providing access into an interior region of hex head 20. The interior region of the hex head 20 further incorporates an open-ended threaded socket head set screw receptacle 50 for accommodating socket head set screw 30. Open-ended threaded socket head set screw receptacle 50 at least partially enters hanger bolt housing 40 and, in conjunction with socket head set screw 30, provides a surface by which hanger bolt 60 may be abutted against. Moreover, open-ended threaded socket head set screw receptacle 50 can be adjusted in depth so as to allow for socket head set screw 30 to be positioned to provide an abutting surface for a variety of hanger bolt lengths. Securing hanger bolt 60 is accomplished by socket head set screw 30, which is accommodated by the open-ended threaded socket head set screw receptacle 50. Socket head set screw access opening 22 is threaded in a manner that is complementary to the threading of the socket head set screw 30. Thus, in one aspect of the preferred embodiment, socket head set screw access opening 22 is threaded in a left-handed fashion in order to complement the left-handed threading of socket head set screw 30.

Preferably, socket head set screw 30 is placed in a threaded engagement with socket head set screw access hole 22 and rotated to facilitate the placement of socket head set screw 30 within open-ended socket head set screw receptacle 50 to a user-defined position. It is also contemplated that the manner by which socket head set screw 30 is positioned could include other means known to those skilled in the art, such as slides and grooves or the like.

In the embodiment illustrated in FIG. 2, socket head set screw 30 includes a second upper surface 31. Preferably, second upper surface 31 further comprises a proximal adjustment point 32. To provide for the adjustment of socket head set screw 30 by proximal adjustment point 32, it is preferred that proximal adjustment point 32 incorporate a site for attachment of a tool to facilitate the rotational movement of socket head set screw 30. In the preferred embodiment of the present intention, the site of attachment accommodates an Allen wrench to facilitate such rotational movement. Moreover, it is contemplated that the tool can be selected from any one of a number of conventional tools, such as screwdrivers or the like, with proximal adjustment point 32 adapted to accommodate such tools.

In accordance with the present invention, proximal adjustment point 32 is engaged to adjust a position of socket head set screw 30 within open-ended threaded socket head set screw receptacle 50. More particularly, proximal adjustment point 32 can be engaged to raise or lower socket head set screw 30 within open-ended threaded socket head set screw receptacle 50 along the longitudinal axis of adapter 10 in order to adjust the spatial relationship between socket head set screw 30 and hanger bolt 60. Furthermore, to accomplish the aforementioned goals of the present invention, socket head set screw 30 can be constructed and arranged to abut the hanger bolt 60. More specifically, socket head set screw 30 is provided in an abutting arrangement to prevent excessive movement of hanger bolt 60 up adapter 10, thereby forcing hanger bolt 60 to drill into the substrate.

In further accord with the preferred embodiment of the present invention, hex head 20 can additionally be constructed to include hanger bolt housing 40. As illustrated in FIG. 1, hanger bolt housing 40 generally extends distally from first upper surface 21 of hex head 20. Furthermore, hanger bolt housing 40 has a distal end that provides hanger bolt 60 with an entry point into adapter 10. The entry point of the distal end is, in the preferred embodiment, a hanger bolt access opening 42 to impart the ability to insert hanger bolt 60 into an engaged position with adapter 10.

Figure 3:
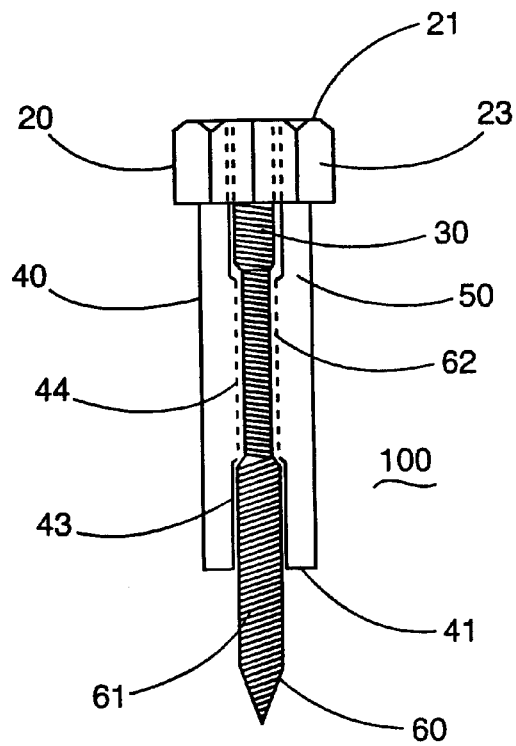
FIG. 3 is an illustration of a side view of a hanger bolt in operative engagement with the present invention of FIG. 1.

Additionally, hanger bolt access opening 42 of the preferred embodiment is oversized, as is illustrated in FIG. 1. One benefit to oversizing hanger bolt access opening 42 is that it permits the user to quickly and efficiently insert a hanger bolt 60 into hanger bolt access opening 42 and engage hanger bolt 60 with adapter 10. Another benefit to oversizing hanger bolt access opening 42 is that the oversizing allows for the use of hanger bolts that have at least two different threaded portions, as shown in FIG. 3, with the more distal threaded portion 61 having a greater diameter that the more proximal threaded portion 62.

In further accordance with the preferred embodiment, hanger bolt access opening 42 provides access to an interior 43 of hanger bolt housing 40. Preferably, hanger bolt access opening 42 extends at least partially proximally into interior 43 of hanger bolt housing 40 and includes a threaded hanger boat channel 44. It is preferred that threaded hanger bolt channel 44 extend proximally from oversized hanger bolt access opening 42 to open-ended threaded socket head set screw receptacle 50. This assembly permits the socket head set screw 30 to contact hanger bolt 60 in an abutting arrangement. To this end, threaded hanger bolt channel 44 accommodates the hanger bolt 60. In the preferred embodiment, hanger bolt 60 is threaded and threaded hanger bolt channel 44 is threaded in a manner complementary to that of proximal threaded portion 62 of hanger bolt 60.

This complementary arrangement allows for a threaded securement of hanger bolt 60 within threaded hanger bolt channel 44. Once hanger bolt 60 is positioned as far as possible proximally, socket head set screw 30 will be in an abutting position relative to hanger bolt 60. Upon abutting socket head set screw 30, hanger bolt 60 is drilled into a substrate, such as wood, concrete, or the like. Preferably, the drill, speed wrench, ratchet, or the like is then reversed, so that adapter 10 is disengaged from hanger bolt 60, thereby leaving hanger bolt 60 in the substrate.

Occasionally, hanger bolt 60 and socket head set screw 30 are in such close abutment that they are in a fixed engagement. When this occurs, the drill, speed wrench, ratchet, or the like and associated attachment is disengaged from adapter 10, so that proximal adjustment point 32 may be accessed. In the preferred embodiment, proximal adjustment point 32 is engaged to raise socket head set screw 30 from the abutting position relative to hanger bolt 60 to a non-abutting position relative to hanger bolt 60. The non-abutting position removes socket head set screw 30 from the fixed engagement with hanger bolt 60. The left-handed rotation of socket head set screw 30 ensures that hanger bolt 60 is not raised out of the substrate while the fixed engagement between socket head set screw 30 and hanger bolt 60 is broken. Once the fixed engagement is broken, the drill, speed wrench, ratchet, or the like and associated attachment is repositioned on adapter 10. Hanger bolt 60 is then removed from threaded hanger bolt channel 44 by reverse-rotating adapter 10 until hanger bolt 60 completely exits from adapter 10.

In practice, the preferred embodiment of the present invention is affixed to a powered drill. The preferred method for drilling hanger bolts into a substrate is carried out through several steps. Initially, in accordance with the present invention, there is provided an adapter 10 having a left-handed socket head set screw 30. As illustrated in FIG. 3, once adapter 10 is provided, a hanger bolt 60 is inserted into an operative engagement with adapter 10 to form an adapter assembly 100.

Adapter assembly 100 is placed in an operative engagement with a powered drill, and adapter assembly 100 is subsequently rotated with the powered drill to drive hanger bolt 60 into the substrate. In order for hanger bolt 60 to remain in the substrate, adapter 10 is reverse-rotated to disengage hanger bolt 60 from the operative engagement with adapter 10. The method of the present invention additionally includes the steps of placing hanger bolt 60 in an abutting position relative to left-handed socket head set screw 30, and raising left-handed socket head set screw 30 from the abutting position relative to hanger bolt 60 to a non-abutting position relative to hanger bolt 60.

As stated previously, hanger bolt 60 and socket head set screw 30 are periodically in such close abutment that they are in a fixed engagement. In order to remove hanger bolt 60 and socket head set screw 30 from such a fixed engagement, the drill and associated drill attachment is disengaged from adapter 10, so that proximal adjustment point 32 may be accessed. In carrying out the method of the present invention for drilling hanger bolts into a substrate, proximal adjustment point 32 of adapter 10 is engaged to raise socket head set screw 30 from the abutting position relative to hanger bolt 60 to a non-abutting position relative to hanger bolt 60. The non-abutting position removes socket head set screw 30 from the fixed engagement with hanger bolt 60.

As stated above, the left-handed rotation of socket head set screw 30 ensures that hanger bolt 60 is not raised out of the substrate while the fixed engagement between socket head set screw 30 and hanger bolt 60 is broken. Once the fixed engagement is broken, the drill, speed wrench, ratchet, or the like and associated attachment is repositioned on adapter 10. Hanger bolt 60 is then removed from threaded hanger bolt channel 44 by reverse-rotating adapter 10 until hanger bolt 60 completely exits from adapter 10.

Figure 4A:
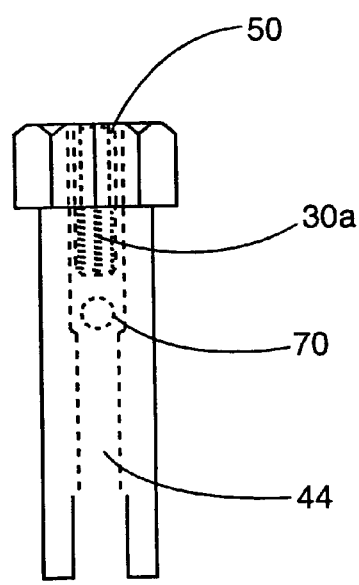
FIG. 4a is an illustration of a side view of an alternative embodiment of the present invention.

An alternative embodiment of the present is illustrated in FIG. 4a. The alternative embodiment of FIG. 4a uses a right-handed socket head set screw 30a. The use of right-handed socket head set screw 30a allows for greater cost savings, since right-handed socket head set screws are readily and inexpensively available. In this alternative embodiment, a ball bearing 70 is placed within open-ended threaded socket head set screw receptacle 50 prior to the insertion of socket head set screw 30a. Ball bearing 70 is of sufficient diameter so as to prevent it from passing out of open-ended threaded socket head set screw receptacle 50 and into threaded hanger bolt channel 44. Once socket head set screw 30a is positioned within open-ended socket head set screw receptacle 50, ball bearing 70 is trapped therein. Ball bearing 70 is moveable within open-ended socket head set screw receptacle 50, thus permitting contact with various lengths of hanger bolts.

Figure 4B:
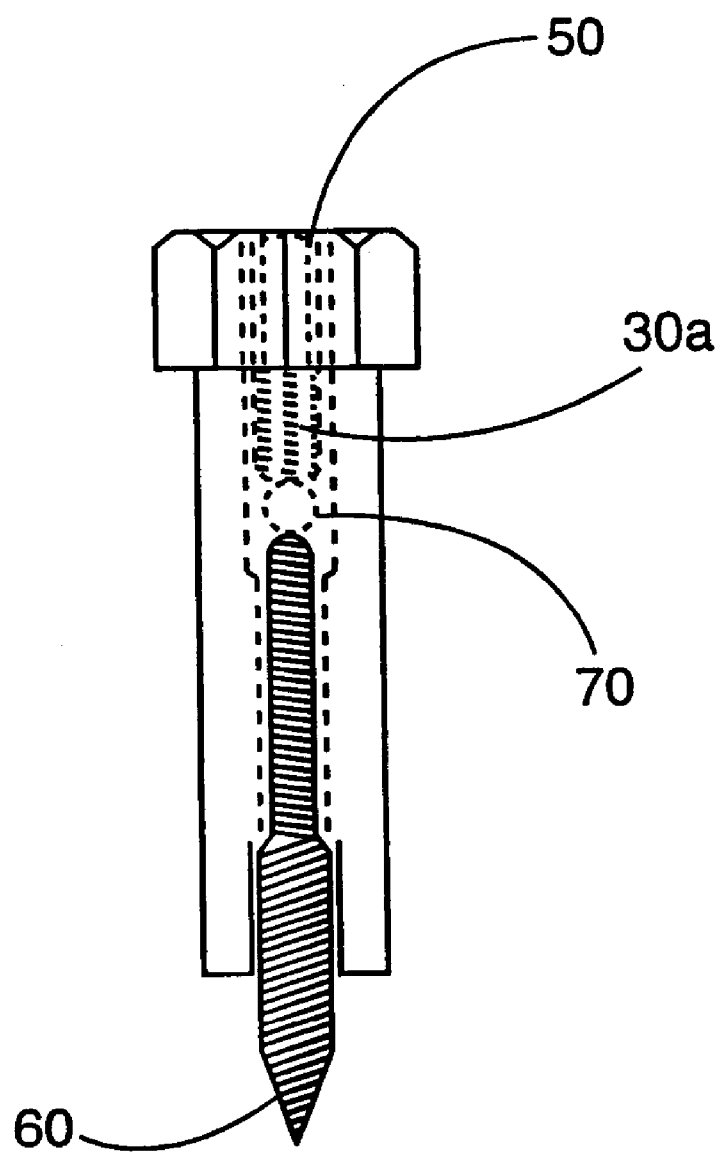

In use, as shown in FIG. 4b, hanger bolt 60 pushes ball bearing 70 to a position abutting socket head set screw 30a, so that ball bearing 70 abuts both socket head set screw 30a and hanger bolt 60. This arrangement permits the socket head set screw to be threaded either in a left-handed or right-handed fashion.

As with the preferred embodiment, the alternative embodiment of FIGS. 4a and 4b is affixed to a powered drill. The preferred method for drilling hanger bolts into a substrate is carried out through several steps. Initially, in accordance with the present invention, there is provided an adapter 10 having a left-handed socket head set screw 30. As illustrated in FIG. 4b, once adapter 10 is provided, a hanger bolt 60 is inserted into an operative engagement with adapter 10 to form an adapter assembly 100.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the following numbered claims.

What is claimed is:

1. An adapter for hanger bolts comprising:
   a hex head adapted for use in a receiving device, wherein said hex head has a first upper surface, said first upper surface having a socket head set screw access opening, said hex head further comprising an open-ended threaded socket head set screw receptacle, wherein said open-ended threaded socket head set screw receptacle at least partially enters a hanger bolt housing and wherein said open-ended threaded socket head set screw receptacle accommodates a socket head set screw;
   said socket head set screw having a left-handed thread, wherein said socket head set screw is set at least partially in said socket head set screw receptacle of said hex head, wherein said socket head set screw has a second upper surface, said second upper surface further comprising a proximal adjustment point, wherein said proximal adjustment point is engaged to adjust a position of said socket head set screw within said open-ended threaded socket head set screw receptacle, wherein said socket head set screw is arranged to abut a hanger bolt, and said hanger bolt housing having a threaded hanger bolt channel for accommodating said hanger bolt, said threaded hanger bolt channel abutting an end of said socket head set screw receptacle.

2. An adapter for hanger bolts comprising:

a hex head adapted for use in a receiving device;

a socket head set screw having a thread, wherein said socket head set screw is set at least partially in a socket head set screw receptacle of said hex head, wherein a ball bearing is moveably positioned between said socket head set screw and an end of said socket head set screw receptacle; and said hanger bolt housing having a threaded hanger bolt channel for accommodating said hanger bolt, said threaded hanger bolt channel abutting an end of said socket head set screw receptacle.

3. An adapter for hanger bolts comprising:

a hex head adapted for use in a receiving device; wherein said hex head further comprises said hanger bolt housing, wherein said hanger bolt housing extends distally from said first upper surface, wherein said hanger bolt housing has a distal end, wherein said distal end has a hanger bolt access opening, and wherein said hanger bolt access opening is oversized relative to a hanger bolt;

a socket head set screw having a thread, wherein said socket head set screw is set at least partially in a socket head set screw receptacle of said hex head; and said hanger bolt housing having a threaded hanger bolt channel for accommodating said hanger bolt, said threaded hanger bolt channel abutting an end of said socket head set screw receptacle.

4. The adapter according to claim 3 wherein said hanger bolt access opening provides access to an interior of said hanger bolt housing.

5. The adapter according to claim 4 wherein said hanger bolt access opening extends at least partially proximally into said interior.

6. The adapter according to claim 5 wherein said interior has a threaded hanger bolt channel.

7. The adapter according to claim 6 wherein said threaded hanger bolt channel extends proximally from said oversized opening to said open-ended threaded socket head set screw receptacle.

8. The adapter according to claim 7 wherein said threaded hanger bolt channel accommodates said hanger bolt.

9. The adapter according to claim 8 wherein said hanger bolt is threaded.

10. The adapter according to claim 9 wherein said socket head set screw is in an abutting position relative to said hanger bolt.

11. The adapter according to claim 10 wherein said hanger bolt is drilled into a substrate.

12. The adapter according to claim 11 wherein said proximal adjustment point is engaged to raise said socket head set screw from said abutting position relative to said hanger bolt to a non-abutting position relative to said hanger bolt.

13. The adapter according to claim 12 wherein said hanger bolt is removed from said threaded hanger bolt channel.

14. The adapter according to claim 13 wherein said hanger bolt is removed by reverse-rotating said adapter.

15. An adapter for hanger bolts comprising:

a hex head adapted for use in a receiving device, wherein said hex head has a first upper surface, said first upper surface having a socket head set screw access opening, said hex head further comprising an open-ended threaded socket head set screw receptacle, wherein said open-ended threaded socket head set screw receptacle at least partially enters a hanger bolt housing and wherein said open-ended threaded socket head set screw receptacle accommodates a socket head set screw, wherein a ball bearing is moveably positioned between said socket head set screw and an end of said socket head set screw receptacle;

said socket head set screw having a left-handed thread, wherein said socket head set screw is set at least partially in said socket head set screw receptacle of said hex head, wherein said socket head set screw has a second upper surface, said second upper surface further comprising a proximal adjustment point, wherein said proximal adjustment point is engaged to adjust a position of said socket head set screw within said open-ended threaded socket head set screw receptacle, wherein said socket head set screw is arranged to abut a hanger bolt, and said hanger bolt housing having a threaded hanger bolt channel for accommodating said hanger bolt, said threaded hanger bolt channel abutting an end of said socket head set screw receptacle.

* * * * *